No. 829,268. PATENTED AUG. 21, 1906.
G. A. GRIFFIN.
EYEGLASSES AND SPECTACLES.
APPLICATION FILED JAN. 26, 1905.

Witnesses
Edgeworth Greene
M. J. Mahony

George A. Griffin Inventor
By his Attorney H. A. West

UNITED STATES PATENT OFFICE.

GEORGE A. GRIFFIN, OF BROOKLYN, NEW YORK.

EYEGLASSES AND SPECTACLES.

No. 829,268. Specification of Letters Patent. Patented Aug. 21, 1906.

Application filed January 26, 1905. Serial No. 242,796.

*To all whom it may concern:*

Be it known that I, GEORGE A. GRIFFIN, a citizen of the United States, and a resident of Brooklyn, in the county of Kings and State of New York, have invented certain new and useful Improvements in Eyeglasses and Spectacles, of which the following is a specification.

My invention relates to the fastenings for the nose spring and guards, either or both, to the lens-mounting of eyeglasses, spectacles, &c., the object being to prevent the loosening of the parts and to render the connection sanitary.

The invention consists mainly in so constructing the screw that some portion of its head after the screw is turned home may be made to engage with some portion of the mounting which will prevent the screw from turning.

The invention also consists in the construction, arrangement, and combination of parts, all as hereinafter described.

Figure 1:
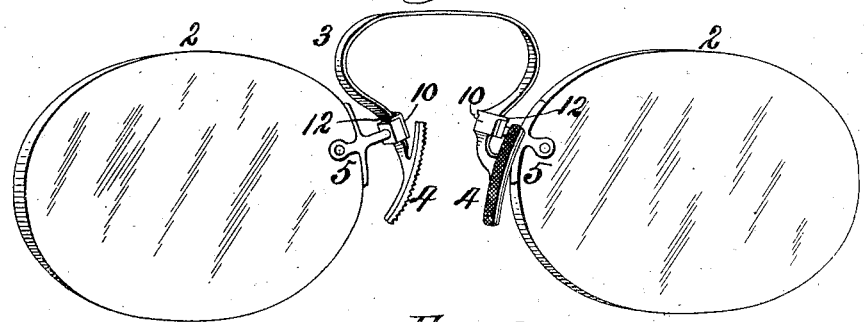
Figure 2:
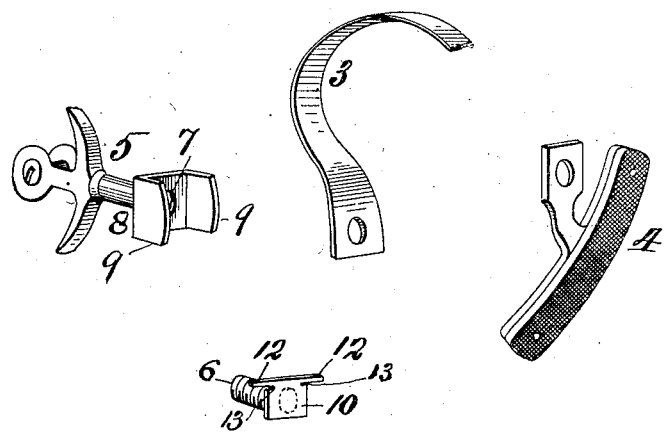

In the accompanying drawings, to which reference is made and which form a part of this specification, Figure 1 is a perspective view of a pair of eyeglasses, illustrating my invention applied thereto; and Fig. 2 is a perspective view showing various parts separated.

In the drawings, 2 2 designate the lenses of eyeglasses or spectacles, 3 the nose-spring, and 4 4 the nose-guards, all of which may be of the usual or of any approved form of construction.

The ends of the nose-spring and the arms of the nose-guards are secured to the lens-mounting 5 5 of any form by screws 6, each of which enters a screw-tap 7, made in a stud-post 8 between the flanges 9 9 thereof. Each screw is provided with a pliable plate 10, some portion of which may be made to engage with a relatively permanent part—as, for example, the stud-post, the nose-spring, or the nose-guard or other permanent part. The said plate on the screw is by preference adapted to cover the space between the flanges of the stud-post, as shown in Fig. 1, thus preventing verdigris, moisture, dust, &c., from accumulating in the mounting; but I do not limit myself to any special proportions or to any special shape or form of the plate, as it may be made in various forms having portions thereof adapted to be bent into engagement with some permanent part so as to hold the screw from turning back. The form I prefer is shown in Fig. 2, wherein it is provided with one or more ears or projections 12, notched at 13 13 from the plate and adapted to be bent into engagement with the nose-spring, as shown in Fig. 1, or with some other permanent part.

Having thus described my invention, what I claim as new, and desire to secure by Letters Patent, is—

1. A screw having a pliable plate secured to one end thereof forming the head of the screw, said plate being formed at opposite corners with pliable projections 12 and separated by slots 13 from the main portion of the plate, substantially as described.

2. In eyeglasses, the combination with the stud-posts having flanges, and the end of the nose-spring and nose-guards fitted between said flanges, of a stud-screw having a pliable plate secured at one end thereof to make contact with the outer edges of the said flanges, said plate being formed at opposite corners with pliable projections 12 and separated by the slots 13, 13 from the main portion of the plate, substantially as described.

GEORGE A. GRIFFIN.

Witnesses:
H. ALBERTUS WEST,
M. J. MAHONEY.